United States Patent
Kraiman

(10) Patent No.: US 9,615,128 B2
(45) Date of Patent: Apr. 4, 2017

(54) DEDUPLICATION OF SCHEDULED RECORDINGS

(71) Applicant: ARRIS Enterprises, Inc., Suwanee, GA (US)

(72) Inventor: Stephen J. Kraiman, Doylestown, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/722,918

(22) Filed: May 27, 2015

(65) Prior Publication Data

US 2015/0350718 A1 Dec. 3, 2015

Related U.S. Application Data

(60) Provisional application No. 62/003,534, filed on May 27, 2014.

(51) Int. Cl.
*H04N 21/43* (2011.01)
*H04N 21/433* (2011.01)
*H04N 21/4335* (2011.01)

(52) U.S. Cl.
CPC ..... *H04N 21/4334* (2013.01); *H04N 21/4335* (2013.01)

(58) Field of Classification Search
None
See application file for complete search history.

(56) References Cited

U.S. PATENT DOCUMENTS

| | | | |
|---|---|---|---|
| 2002/0087995 A1* | 7/2002 | Pedlow, Jr. | H04N 21/2181 725/87 |
| 2003/0120942 A1* | 6/2003 | Yoshida | G11B 20/00086 713/193 |
| 2003/0220100 A1* | 11/2003 | McElhatten | G06F 3/0482 455/418 |
| 2012/0210382 A1 | 8/2012 | Walker et al. | |
| 2013/0188926 A1 | 7/2013 | Rajagopalan | |
| 2014/0282750 A1* | 9/2014 | Civiletto | H04N 21/2747 725/74 |
| 2015/0003808 A1 | 1/2015 | Rajagopalan | |
| 2015/0019833 A1* | 1/2015 | Aronovich | G06F 12/023 2/23 |

OTHER PUBLICATIONS

"OpenCable™ Specifications: Encoder Boundary Point Specification", Document No. OC-SP-EBP-I01-130118, Cable Television Laboratories, Inc., Jan. 18, 2013.

* cited by examiner

*Primary Examiner* — Eileen Adams
(74) *Attorney, Agent, or Firm* — Stewart M. Wiener

(57) ABSTRACT

In embodiments of a method, system, and device for deduplicating recordings of an audiovisual content, while a stream time is at least equal to a recording start time, and while the stream time has not yet reached a recording end time, a next chunk start time is determined and a new current chunk of the plurality of chunks is recorded, repeatedly until the next chunk start time has been reached. Chunks that each have identical chunk start times and identical chunk end times are deduplicated.

18 Claims, 9 Drawing Sheets

DEDUPLICATION OF SCHEDULED RECORDINGS

BACKGROUND

A conventional digital video recorder ("DVR") is a device that is placed in the home which allows a person to record audiovisual content (e.g., a TV program) to local physical storage, such as a hard drive, and play the content back later at their convenience.

In a subsequent evolution of the digital video recorder, equipment that recorded and stored audiovisual content was moved from the home to other network locations; e.g., to upstream locations in a content distribution network.

In a conventional network-based DVR ("nDVR") storage solution, a recording is created and stored separately for each requesting user, which generally requires that costly enterprise class storage must be used to store each recording separately (based, for example, upon considerations of applicable copyright law).

In further conventional nDVR storage solutions, recordings of a program that are bit-for-bit identical can be deduplicated to a single instance when archived. However, two recordings of a single program will not be bit-for-bit identical if the two recordings do not begin at identical times and end at identical times.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

The embodiments of the methods, systems and devices described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be servers configured to be deployed in a network. Program code is applied to input data to perform the functions described herein and generate output information. The output information is applied to one or more output devices, in known fashion.

Conventional efforts at optimization of nDVR recording and storage have included deduplicating common files when archiving the content. Recordings that are bit for bit identical can be deduplicated. Bit for bit identical recordings can be created by using the same start and stop time for each recording instance, and starting and ending the recording at the same point in the bit stream across all instances of a recording based upon these times.

One example of a conventional method to create time based bit aligned recordings is performed by the following three-step approach:

1. A device, for example the transcoder, periodically inserts a marker containing the time that the portion of the recording was created. The marker must be inserted in such a way that it marks a point in the bit stream that can be used to start or end a recording. An illustrative example of such a marker is the Encoder Boundary Point described by CableLabs OC-EBP-I01-130118.
2. A recorder starts capturing the bits for an instance of a recording at a particular marker. The recorder scans the bit stream for the first marker that contains a time that is greater than or equal to the recording start time. The recorder includes the marker in the recording.
3. A recorder stops capturing the bits of a recording at a particular marker. The recorder scans the bit stream for the first marker that contains a time that is greater than or equal to the end time for the recording. The recorder does not include the final marker in the recording.

Figure 1:
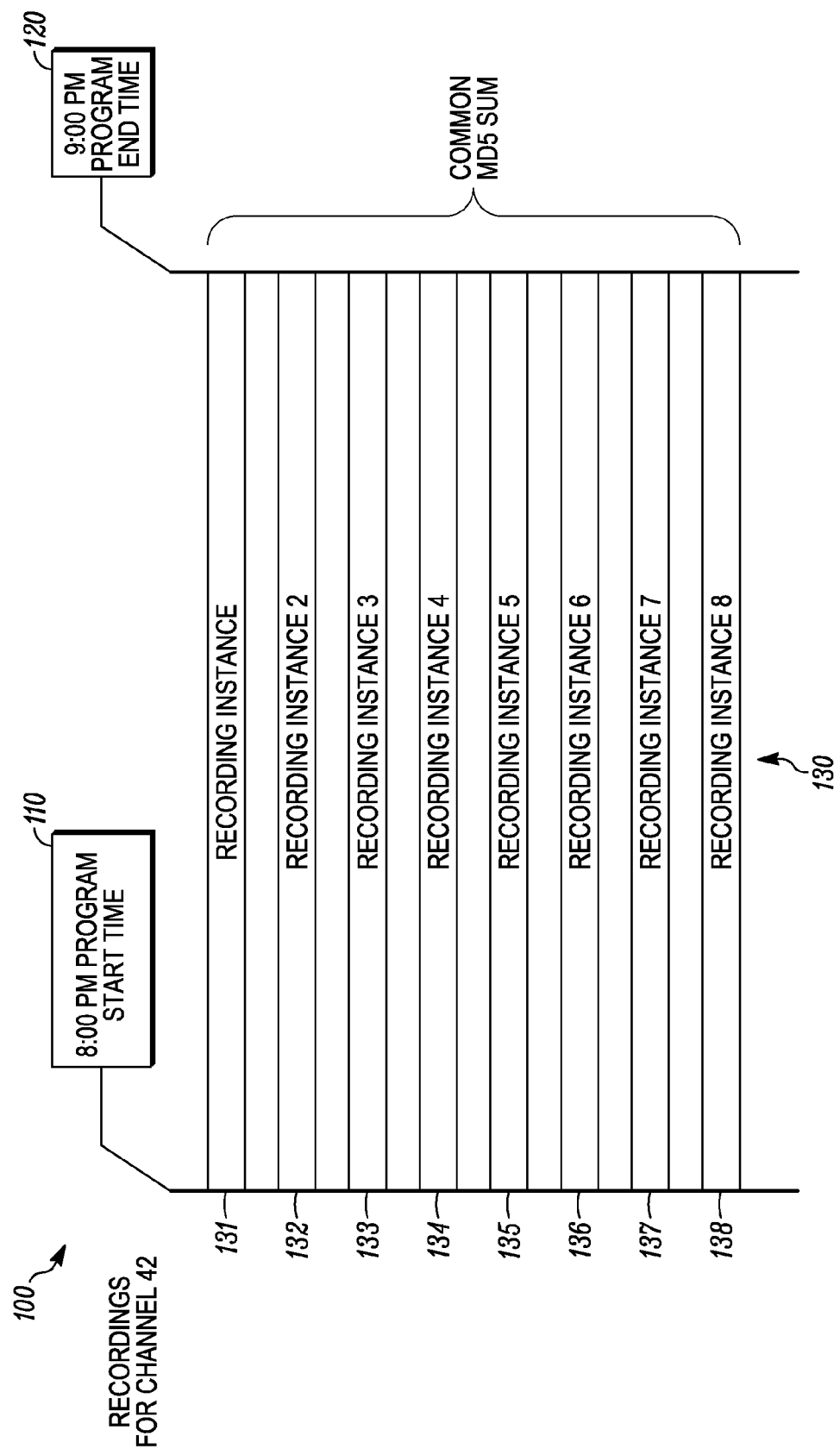
FIG. 1 depicts an illustrative block diagram of archived recordings, with respect to a first recording scenario, in an example of a conventional approach.

FIG. 1 depicts an illustrative block diagram of archived recordings, with respect to a first recording scenario, in an example of a conventional approach. Referring to FIG. 1, as long as all instances of a recording use the same start time, the same stop time, the same video bit stream, and the same rules to select the starting and ending markers, the recordings will be bit for bit identical. One efficient method to verify that two recordings are identical is to compare the MD5 sums. If the MD5 sums are the same, it is highly likely that the files are the same. A conventional enhancement of this method is to verify that the file sizes are also the same.

A conventional DVR that stores video at the user's premises (e.g., on a hard disk at the home of a cable subscriber) typically offers the ability to schedule the recording of a program to start either on time or early, e.g., with respect to a published start time in a program guide. Such a DVR also typically offers the ability to similarly end the recording on time or a period of time after the scheduled end time. It also typically offers the ability to start recording a program after the program has started.

Such variability allows the user to record a program in a variety of ways. For example, if a DVR system allows for 8 different start times (on time, 1, 2, 3, 5, 10, 15, and 20 minutes early) and 8 different end times (on time, 1, 2, 3, 5, 10, 15, and 20 minutes late), then there are 64 possible ways to record a program. A DVR system typically also allows the user to begin recording a program at any time after it has started.

When a large population of users is given these options, it is likely that some of the users will choose a different set of options than others. Each set of options produces a recording with a unique MD5 checksum, which cannot readily be deduplicated with other variations. The difficulty of deduplicating a collection of recordings of a program, for which different recording options were used, has been among the limitations of conventional nDVR systems.

As illustrated in the example of FIG. 1, in a first scenario (e.g., an ideal or optimistic scenario), a program on a particular channel is recorded at the request of eight users, thus creating eight recording instances 131-138 (collectively recording instances 130). Timeline diagram 100 depicts a timeline from a program start time 110 to a program end time 120; in the illustrated example, the timeline 100 spans a period of time in which start time 110 is 8:00 PM and end time 120 is 9:00 PM. In the depicted example of FIG. 1, because all of the eight users have requested identical recording start and end times, corresponding to a known start and end time for the program, the eight recording instances 131-138 will be bit-for-bit identical with one another, and the recording instances 130 accordingly can be conventionally deduplicated in archival storage.

Figure 2:
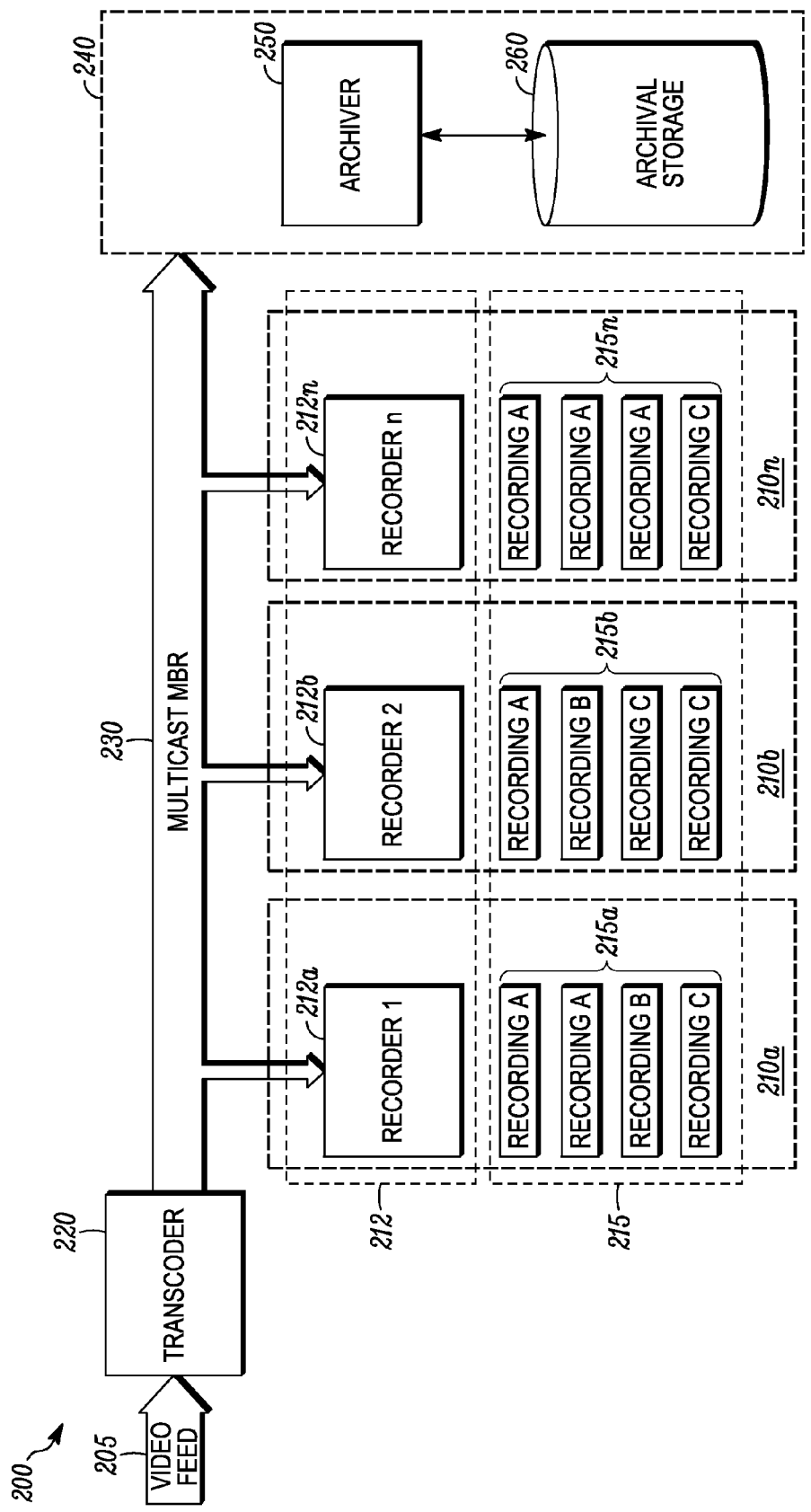
FIG. 2 depicts an illustrative block diagram of a system, illustrated with respect to an example of the first recording scenario.

FIG. 2 depicts an illustrative block diagram of a system 200, illustrated with respect to an example of the first recording scenario. A video feed 205 is transcoded by transcoder 220 for delivery (e.g., as one or more bitstreams, such as a multicast of multi-bitrate recordings) via a network 230 to a plurality of recorders 210, and to an archive system 240 that includes an archiver 250 (e.g., a server or other computer system having one or more processors) and archival storage 260.

As shown in FIG. 2, an example of a deduplication system suitable for use with the scenario of FIG. 1 includes a plurality of recorders 210a . . . 210n (collectively recorders 210), which comprise recording devices 212 (Recorder 1 212a, Recorder 2 212b, . . . Recorder n 212n). Each of the recording devices 212 is able to create one or more recording instances 215; in the illustration, recording device 212a has created four recording instances 215a, recording device 212b has created four recording instances 215b, and so on, through recording device 212n which has created four recording instances 215n.

In this idealistic or optimistic scenario, the recording start and end times are synchronized among the recording devices 210. The recording instances 215 labeled Recording A will be bit-for-bit identical in each of the recorders 210 that has recorded a program corresponding to Recording A. The recording instances 215 labeled Recording B will be bit-for-bit identical in each of the recorders 210 that has recorded a program corresponding to Recording B. The recording instances 215 labeled Recording C will be bit-for-bit identical in each of the recorders 210 that has recorded a program corresponding to Recording C.

Figure 3:
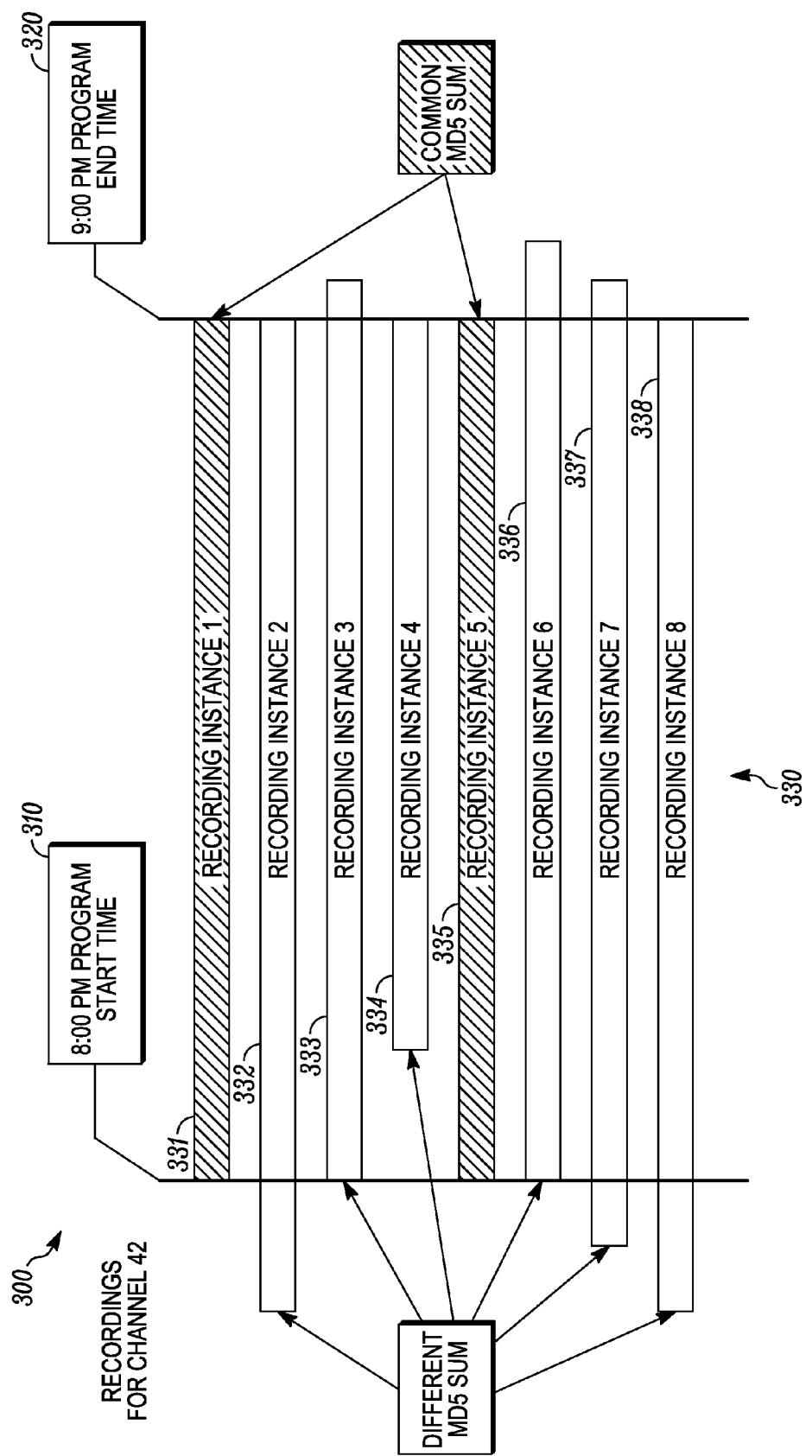
FIG. 3 depicts an illustrative block diagram of archived recordings, with respect to an example of a second recording scenario, in an example of a conventional approach.

FIG. 3 depicts an illustrative block diagram of archived recordings, with respect to an example of a second recording scenario, in an example of a conventional approach. In the depicted example, a program on a particular channel is recorded at the request of eight users, thus creating eight recording instances 331-338 (collectively recording instances 330). Timeline diagram 300 depicts a timeline from a program start time 310 to a program end time 320; in the illustrated example, the timeline 300 spans a period of time in which start time 310 is 8:00 PM and end time 320 is 9:00 PM. As illustrated in the example of FIG. 3, in a second scenario (e.g., a scenario more realistic or less optimistic than the scenario of FIG. 1), a program on a particular channel is recorded at the request of eight users, thus creating eight recording instances 330. However, because (in the example) only two all of the eight users have requested identical recording start and end times, not all of the recording instances will be bit-for-bit identical, and therefore, not all of the recording instances can be conventionally deduplicated in archival storage. In the depicted example, recording instances 331 and 335 are bit-for-bit identical, having a common MD5 sum, and the other recording instances 332, 333, 334, 336, 337, 338 are not bit-for-bit identical, having different MD5 sums.

Figure 4:
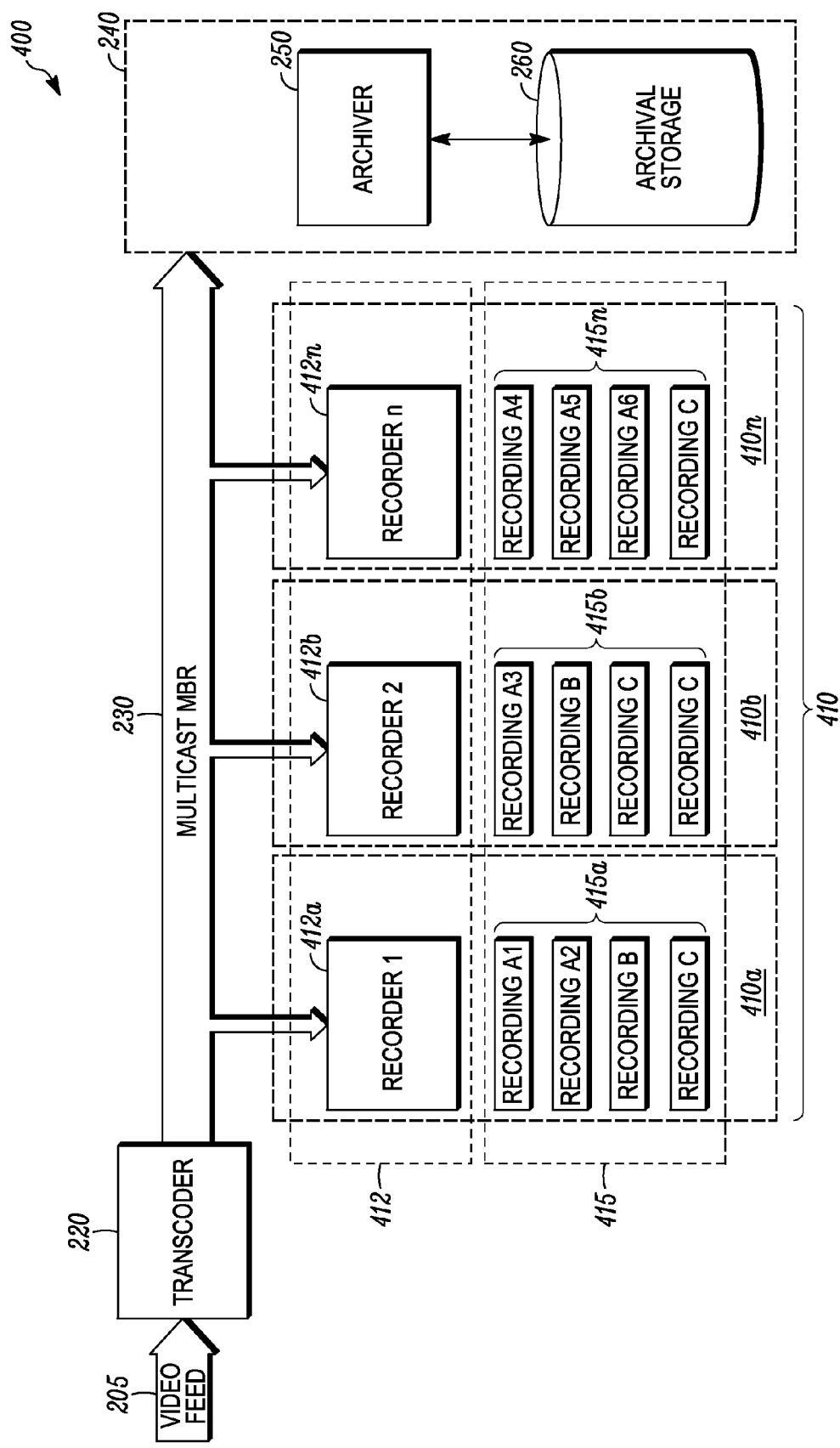
FIG. 4 depicts an illustrative block diagram of a system, illustrated with respect to an example of the second recording scenario.

FIG. 4 depicts an illustrative block diagram of a system, illustrated with respect to an example of the second recording scenario. As shown in FIG. 4, an example of a deduplication system, such as that of FIG. 2, is applied to the scenario of FIG. 3. An example of a deduplication system suitable for use with the scenario of FIG. 3 includes a plurality of recorders 410a . . . 410n (collectively recorders 410), which comprise recording devices 412 (Recorder 1 412a, Recorder 2 412b, . . . Recorder n 412n). Each of the recording devices 412 is able to create one or more recording instances 415; in the illustration, recording device 412a has created four recording instances 415a, recording device 412b has created four recording instances 415b, and so on, through recording device 412n which has created four recording instances 415n.

In the more realistic (or less optimistic) scenario of the example of FIG. 4, the recording start and end times are not synchronized among the recording devices. In the depicted example, because the recordings of a particular program (e.g., program A) are not bit-for-bit identical in each of the recorders that has recorded all or part of program A, the recording devices have created, among the recording instances 415, a plurality of recording instances (Recording A1, A2 . . . A6) which cannot be conventionally deduplicated in the archival storage, because they are not bit-for-bit identical.

Figure 9:
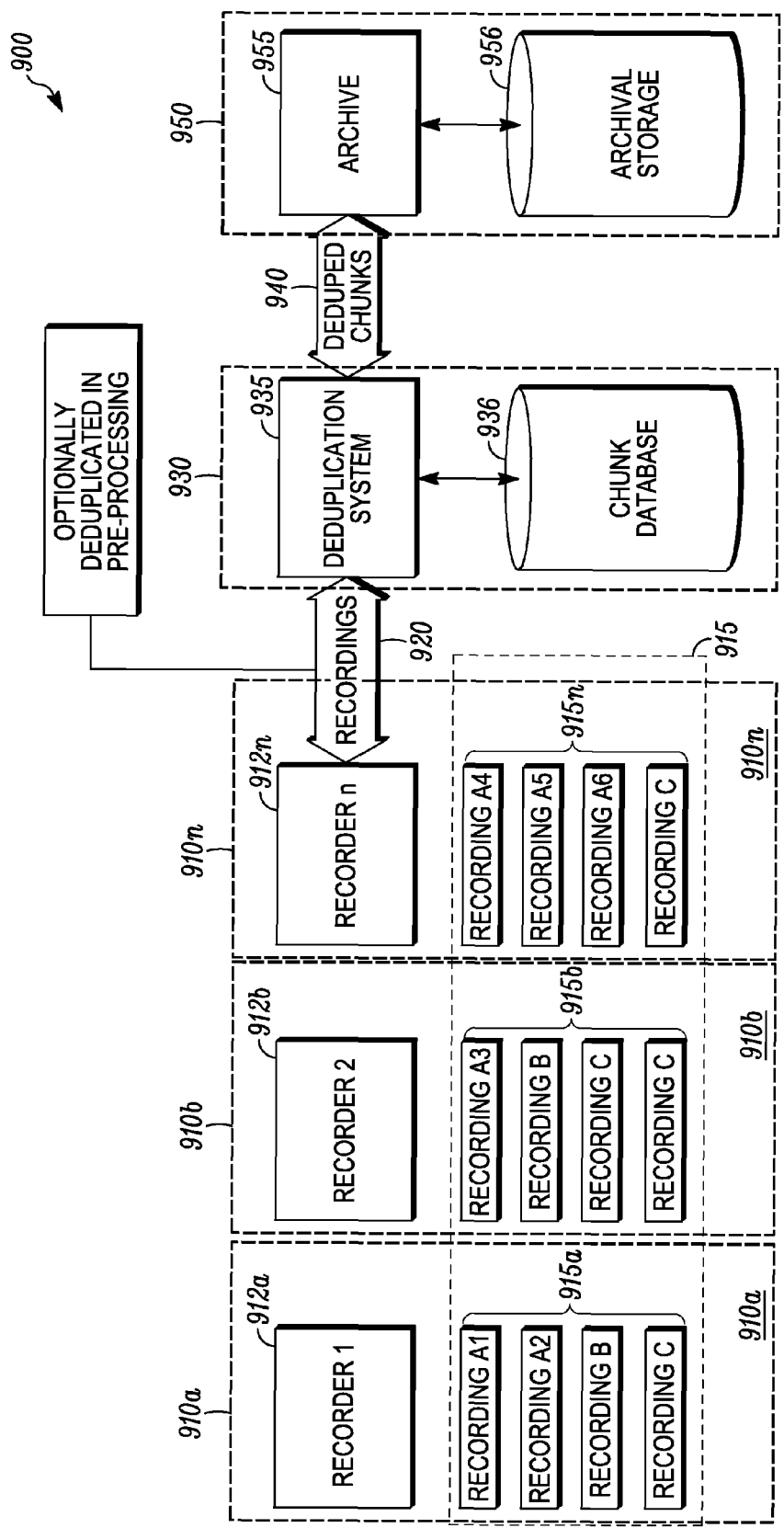
FIG. 9 depicts an illustrative block diagram of a system, with respect to an example of the second recording scenario, in an example of a further embodiment.

Conventionally, the transcoder 220 and all of the recorders 210, 410, 910 shown in FIG. 2, FIG. 4, and FIG. 9 will share a common time reference. This is typically implemented through a common NTP server.

Aspects of the present disclosure provide, in illustrative embodiments, a method and a system to optimize deduplication of scheduled recordings (e.g., randomly scheduled recordings of audiovisual content) for more efficient archival storage.

In an embodiment of the invention, each instance of a recording (such as those depicted as recording instance 215, 415) is divided into a plurality of chunks. With the possible exception of the beginning and ending chunk, each chunk is created using a predetermined chunk start time and a predetermined chunk stop time. For each chunk of a scheduled content item (such as a TV program), the predetermined chunk start time and the predetermined chunk stop time are known or easily determined; for example, based on a chunk duration and a published start time and end time (or program duration) in a program guide. The chunk duration must be substantially shorter than the duration of the content that is to be recorded. A "complete" chunk is defined as a chunk that begins on the predetermined chunk start time for that chunk and ends on the predetermined chunk stop time for that chunk. For all instances of a recording, each complete chunk having the same start time and stop time will be bit for bit identical and can be deduplicated, even if two instances of a recording have different overall start and stop times.

As a further example, rather than treating a recording as a flat file, one can think of the recording as a series of discrete chunks. A "well formed chunk" has a known or predetermined start and stop time. Each chunk has a unique MD5 sum. All well formed chunks of a recording, across all instances of a recording (i.e., regardless of which recorder has recorded the instance) will have the same MD5 sum as a corresponding well formed chuck in another recording device. Corresponding chunks from different recording devices can therefore be deduplicated, even if the complete program recordings in the individual recording devices have different MD5 sums due to different start times or dropped packets.

Referring to FIGS. 5-9, in an illustrative embodiment, instead of defining a recording instance as a single file, a recording instance can be defined as a series of files or chunks of the recording, each with a maximum duration in seconds (ChunkPeriodInSeconds), where each file, with the possible exception of the first file and the last file, are created with well-known start and stop times. All instances of a chunk with the same start and stop time will be bit for bit identical, and using the mechanism previously described can be deduplicated during archiving.

A next chunk start time (NextChunkStartTime) is calculated in such a way that any recorder will produce the identical value. One method to do this is to use the Unix epoch as the starting point, and calculate the next chunk start time (ChunkStartTime) as a multiple of the chunk period in seconds (ChunkPeriodInSeconds) relative to a selected time 0 (e.g., the Unix epoch).

Care needs to be taken in choosing the value of ChunkPeriodInSeconds. In an embodiment, ChunkPeriodInSeconds should be at least several times smaller than the duration of a typical recording. However, it should be large enough that the number of chunks created is manageable. In an illustrative example, 300 seconds (five minutes) seems to be a reasonable number for a recording of 30 minutes or longer.

The NextChunkStartTime increments in units of ChunkPeriodInSeconds.

Table 1 is an illustrative example of a Python function getNextChunkStartTime.

TABLE 1

```
import time
def getNextChunkStartTime(t, chunkPeriodInSeconds):
    t = (int(t) + chunkPeriodInSeconds) / chunkPeriodInSeconds *
    chunkPeriodInSeconds
    return t
```

In the illustrative example set forth in Table 1, the input parameter t to the function getNextChunkStartTime is a time represented as the number of seconds from the Unix epoch. The function getNextChunkStartTime uses the epoch as the starting point in time. Using this function, a plurality of Recorders (e.g., in FIG. 2) can calculate the same NextChunkStartTime.

In an embodiment, subsequent start times are calculated by adding the ChunkPeriodInSeconds to the current NextChunkStartTime. Table 2 is an illustrative example of code for calculating a subsequent NextChunkStartTime.

TABLE 2

NextChunkStartTime = NextChunkStartTime + ChunkPeriodInSeconds

A representative pseudo-code representation of an implementation of a method, according to an embodiment, is provided in Table 3, wherein EBP refers to Encoder Boundary Point.

TABLE 3

```
RecordingStarted = false
while(EBPTimeInStream >= RecordingStartTime && EBPTimeInStream
<= RecordingEndTime)
    if(RecordingStarted == false)
        Start the capture of the chunk starting at EBPTimeInStream
        RecordingStarted = true
        NextChunkStartTime = \
            getNextChunkStartTime(EBPTimeInStream,
            ChunkPeriodInSeconds)
    else if (EBPTimeInStream >= NextChunkStartTime)
        End the capture of the chunk before the EBPTimeInStream
        Start the capture of the chunk starting at EBPTimeInStream
        NextChunkStartTime += ChunkPeriodInSeconds
// recording has completed (or never started)
if (RecordingStarted == true)
    End the capture of the chunk before EBPTimeInStream
```

It is noted that, in a typical scenario, the first chunk will most likely not start on a chunk start time boundary, but will end on one, if the chunk duration is long enough. Similarly, in a typical scenario, the last chunk will most likely start on a chunk start time boundary, but will probably not end on one.

It is further noted that, in a typical scenario, all chunks between the starting chunk and the ending chunk will start and end on chunk boundaries.

In a further embodiment, an implementation variation is provided for MBR (multi-bitrate recording). In an example of an MBR implementation, a recording can be represented by a series of bit streams with the same start and end times, but are encoded with different parameters. The parameters may be, but are not limited to, encoding algorithm, resolution, and bit rate.

Figure 5:
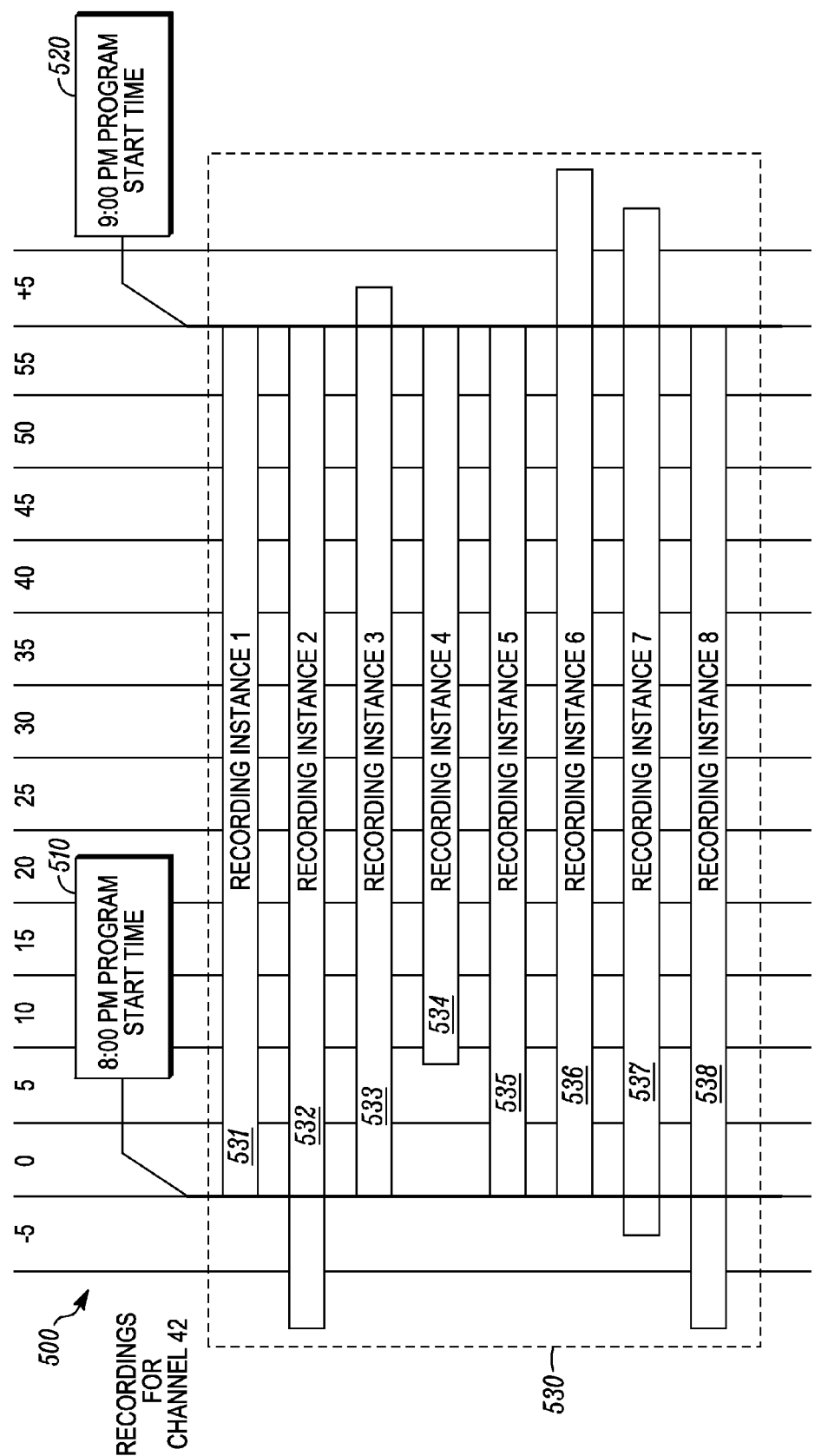
FIG. 5 depicts an illustrative timing view depicting a plurality of recording instances, with respect to an example of the second recording scenario, in an example of an embodiment.

FIG. 5 depicts an illustrative timing view depicting a plurality of recording instances, with respect to an example of the second recording scenario, in an example of an embodiment. Timeline diagram 500 depicts a timeline from a program start time 510 to a program end time 520; in the illustrated example, the timeline 500 spans a period of time in which start time 510 is 8:00 PM and end time 520 is 9:00 PM. In the depicted example of an illustrative timing scenario similar to that of FIG. 3, a program on a particular channel is recorded at the request of eight users, thus creating eight recording instances 531-538 (collectively recording instances 530). In the depicted example, only two all of the eight users have requested identical recording start and end times, and therefore, not all of the recording instances 530 will be bit-for-bit identical. For ease of understanding, the illustration of timeline 500 depicts chunk boundaries on a horizontal axis, each at multiples of five minutes before or after the scheduled program start time.

Figure 6:
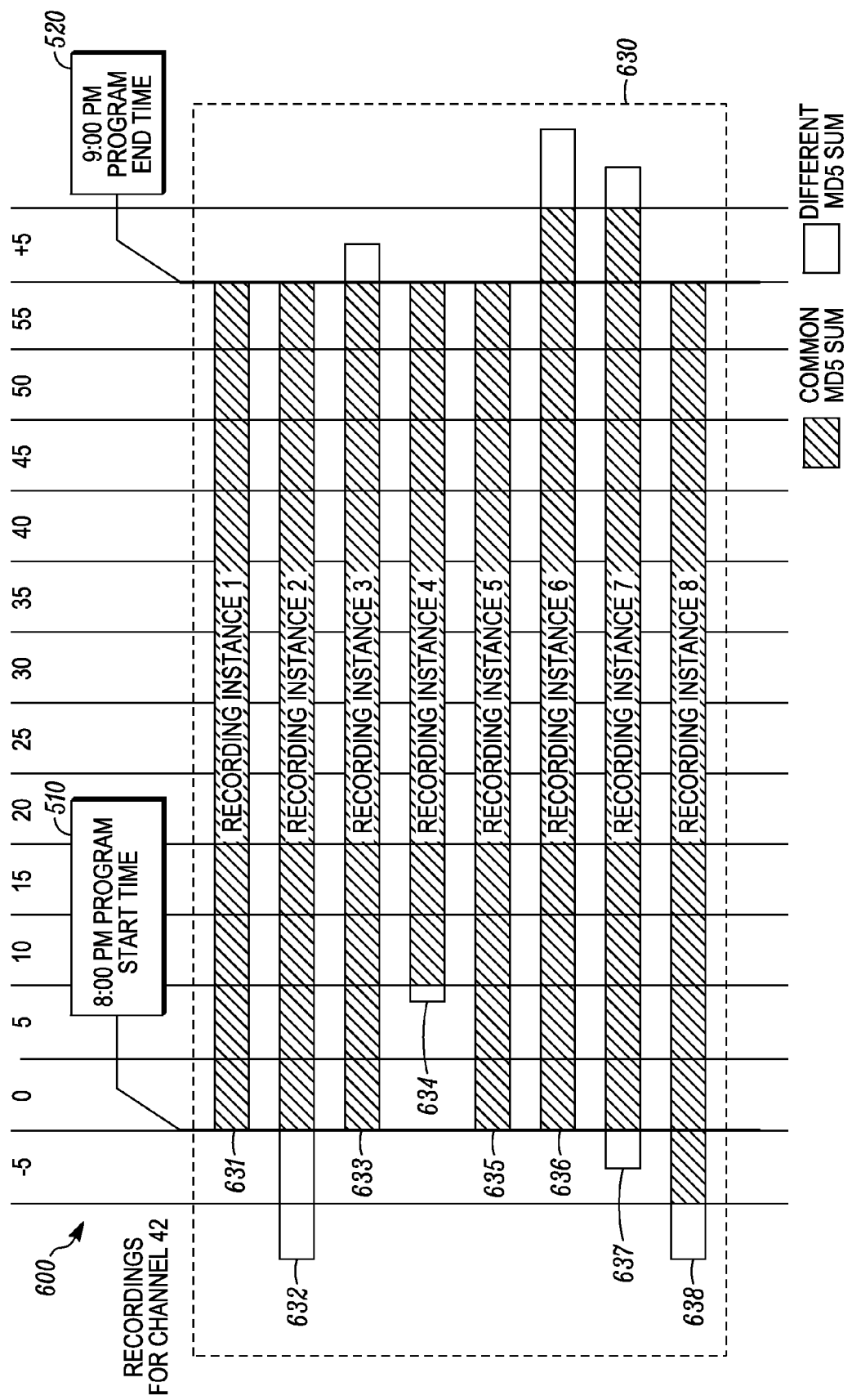
FIG. 6 depicts an illustrative timing view depicting a plurality of recording instances and indicating MD5 checksum commonalities, in an example of an embodiment.

FIG. 6 depicts an illustrative timing view depicting a plurality of recording instances and indicating MD5 checksum commonalities, in an example of an embodiment.

Timeline diagram 600 depicts a timeline from a program start time 510 to a program end time 520. In an application of an embodiment of the present invention to the illustrative timing scenario of FIG. 5, as shown in the example of FIG. 6, a chunk has a five minute duration, and chunk boundaries are provided at multiples of five minutes before or after the scheduled program start time. Accordingly, all chunks of recording instances 631-638 (collectively recording instances 630) that start and end on the same chunk boundary (e.g., multiples of five minutes before or after the scheduled program start time) will have the same MD5 sum with one another, and can therefore be deduplicated. Such chunks (e.g., well formed chunks) are depicted as shaded in FIG. 6.

Figure 7:
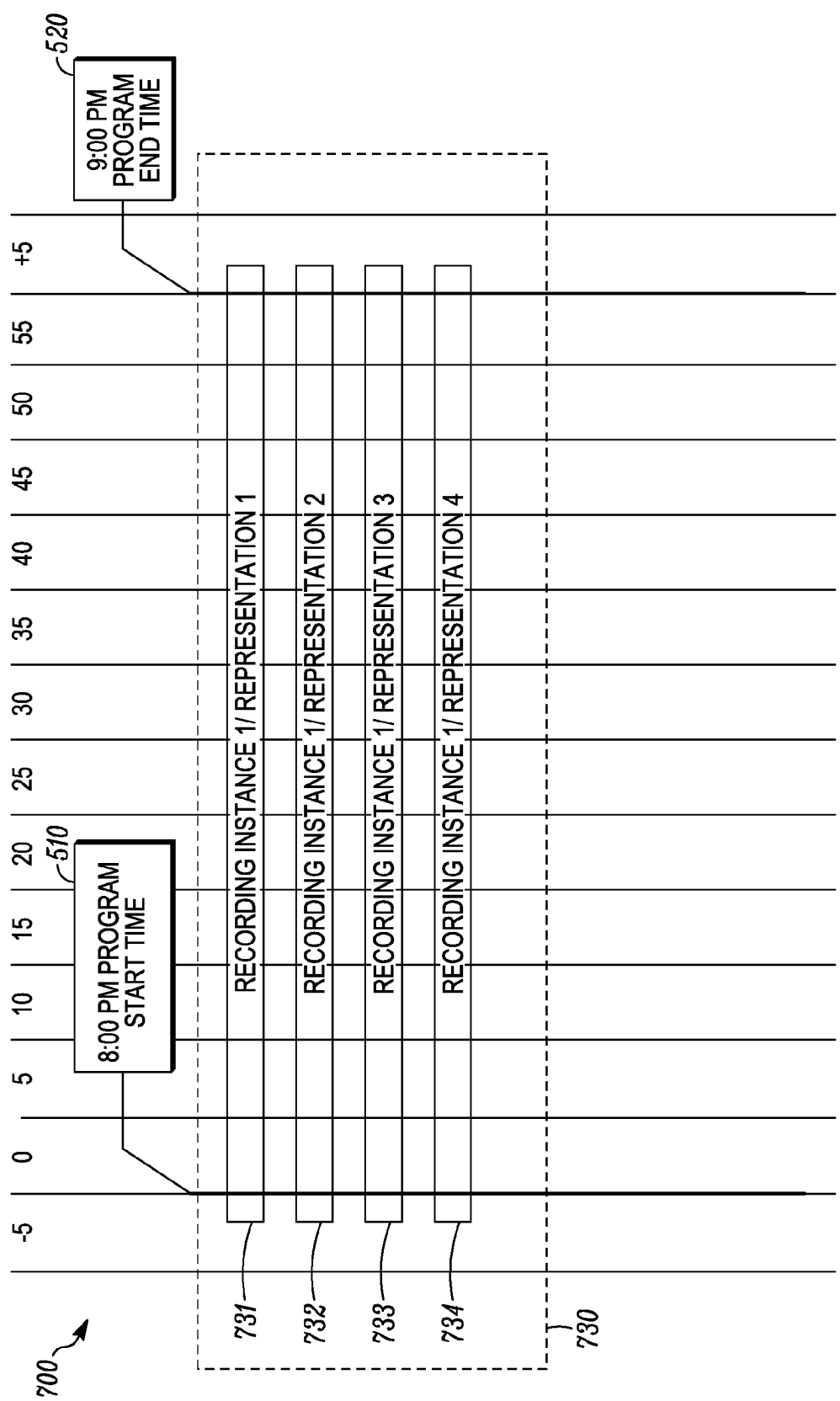
FIG. 7 depicts an illustrative timing view depicting a plurality of representations of a recording instance, in an example of an embodiment.

FIG. 7 depicts an illustrative timing view depicting a plurality of representations of a recording instance, in an example of an embodiment. Timeline diagram 700 depicts a timeline from a program start time 510 to a program end time 520. In an illustrative scenario, a first recording (Recording Instance 1) is stored by four recording devices, thus creating four duplicative representations 731-734; that is, Representation 1 731, Representation 2 732, Representation 3 733, and Representation 4 734 (collectively Representations 730). Note that all depicted representations 730 of Recording Instance 1 have the same start time 510 and end time 520. The first recording may, for example, correspond to recorded audiovisual content such as a television program or segment.

Figure 8:
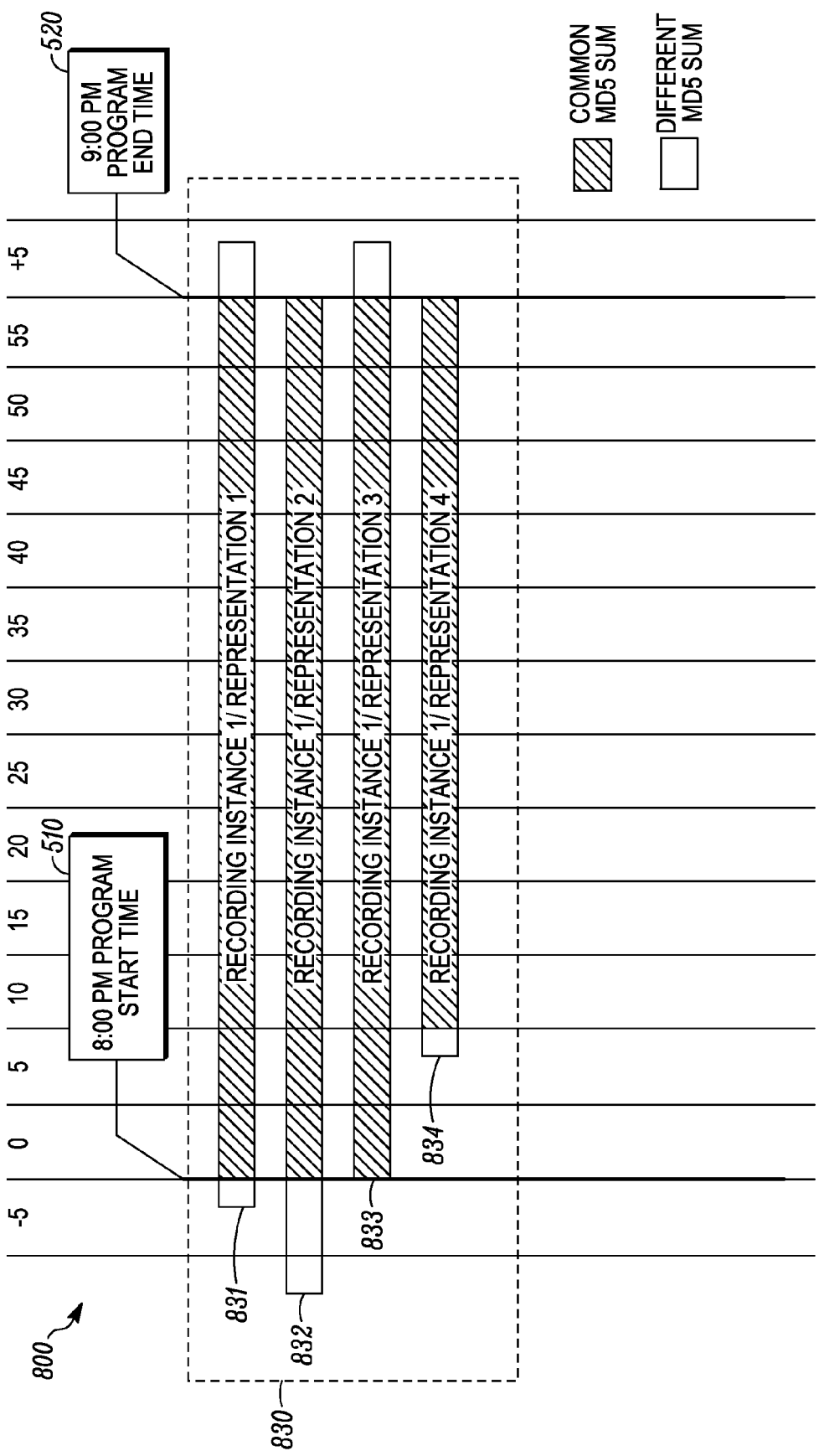
FIG. 8 depicts an illustrative timing view depicting a plurality of recording instances and indicating MD5 checksum commonalities of a shared representation, in an example of an embodiment.

FIG. 8 depicts an illustrative timing view depicting a plurality of recording instances and indicating MD5 checksum commonalities of a shared representation, in an example of an embodiment. Timeline diagram 800 depicts a timeline from a program start time 510 to a program end time 520. In an illustrative scenario, in accordance with the use of an embodiment of the invention, the shaded portions of Recording Instance 1 831, Recording Instance 2 832, Recording Instance 3 833, and Recording Instance 4 834 (collectively Representations 830) can be largely deduplicated, using corresponding chunks of a single Representation 1 (e.g., the chunks corresponding to those of recording instance 1 831). As in FIGS. 5 and 6, each of the recordings start at different times. As before, all chunks that start and end on the same chunk boundary will have the same MD5 sum, and can therefore be deduplicated.

In a further embodiment, a variable chunk period can be provided. The ChunkPeriodInSeconds could be calculated based on the program duration, where the duration is some constant that is not dependent upon the individual scheduled recording start and stop times. For example the target could be 10 chunks per program. So the ChunkPeriodInSeconds for a 30 minutes show would be 3 minutes or 180 seconds. The ChunkPeriodInSeconds for a 60 minute program would be six minutes or 300 seconds. An advantage of this approach would be to reduce the overall number of chunks for longer programs.

In a still further embodiment, a recording is not split into chunks at the time of recording, but rather is stored in its original format or in some intermediate format; for example, a single flat file. The recording is split into chunks at the time of archiving. This embodiment provides, for example, a further benefit of storing the recording on the recorder in a format that differs from the chunked format and that may be preferred over the chunked format (e.g., due to ease of access or lower processing overhead prior to archiving).

FIG. 9 depicts an illustrative block diagram of a system 900, with respect to an example of the second recording scenario, in an example of a further embodiment. Referring to FIG. 9, in this illustrative embodiment, the chunk deduplication process is external to a system 900 that includes recorders 910a . . . 910n (collectively recorders 910) having recording devices 912a . . . 912n which store recordings 915a . . . 915n (collectively recordings 915) prior to deduplication. A recorder 910 storing the recordings 915 is able to send 920 the recordings 915, for chunk deduplication, to a deduplication system 930 in accordance with an embodiment of the present disclosure. An example of a system storing the recordings may do pre-processing of recordings 915 (which may include, for example, conventional forms of deduplication), for example, prior to or as part of the sending 920, and is able to send or post recordings to an embodiment of a deduplicator 930, and is also able to fetch files from a deduplication system 935 of the deduplicator 930. In an illustrative example, the deduplicator 930 includes a deduplication system 935 communicatively coupled to a chunk database 936 for storing chunks, and the deduplicator 930 can provide an API that exposes archiver-like functionality to a recorder 910 storing the recordings. The deduplication system 935 is able to receive recordings and can deduplicate the received recordings at the chunk level, and store deduplicated chunks 940 in an archive system 950 (e.g., an archive system 950 that includes an archive 955 communicatively coupled to archival storage 955). A deduplication system 935 in accordance with an embodiment can also reconstitute the received recordings by fetching chunks from the archive system 950 and returning a reconstituted whole recording to the recorder 910 storing the corresponding recordings. An advantage of the use of pre-processing is that fewer recordings will have to be passed to the deduplication system 935, which reduces network traffic between the recorder 910 storage system and the deduplication system 935, and reduces the amount of processing that has to be done by the deduplication system 935 in accordance with an embodiment.

Among the benefits of embodiments of the invention, recordings that have the same start and stop times, but that are not bit for bit identical because of errors introduced in the recording process, can still be partially deduplicated.

While the principles of the invention have been described above in connection with specific devices, apparatus, systems, and/or methods, it is to be clearly understood that this description is made only by way of example and not as limitation. It will be appreciated that the methods, systems and devices of the described embodiments are capable of being distributed in a computer program product comprising a physical, non-transitory computer readable medium that bears computer usable instructions for one or more processors. The medium may be provided in various forms, including one or more diskettes, compact disks, tapes, chips, magnetic and electronic storage media, and the like. Each program is preferably implemented in a high level procedural or object oriented programming and/or scripting language to communicate with a computer system. However, programs can be implemented in low-level languages such as assembly or machine language, if desired. The computer usable instructions may also be in various forms, including compiled code and non-compiled code (e.g., an interpreted language). Each such computer program is preferably stored on a storage medium or memory device (e.g., solid-state drive, ROM, optical disc) readable by a general or special purpose programmable computer, for configuring and operating the computer when the storage medium or device is read by the computer to perform the procedures described herein. Particular embodiments, for example, may be implemented as a non-transitory computer-readable storage medium, configured with a computer program, where the storage medium so configured causes a computer to operate in a specific and predefined manner to perform the functions described herein.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for deduplicating recordings of an audiovisual content, the method comprising:
   for each of a plurality of recording instances of the audiovisual content, providing bit-accurate segmentation of the recording instance into a plurality of chunks, wherein each chunk has a chunk start time and a chunk end time, and
   wherein, in the plurality of recording instances, any two or more chunks of the audiovisual content are bit-for-bit identical if they each have identical chunk start times and identical chunk end times;
   deduplicating, in the plurality of recording instances, two or more chunks of the audiovisual content that each have identical chunk start times and identical chunk end times;
   wherein each recording instance is associated with a corresponding user request to record at least a portion of the audiovisual content from a recording start time to a recording end time, and each recording instance comprises at least one chunk of the audiovisual content.

2. The method of claim 1, wherein the plurality of recording instances is received from a corresponding plurality of recording devices.

3. The method of claim 1, further comprising:
   in a recording device, while a stream time is at least equal to a recording start time, and the stream time has not yet reached a recording end time, repeatedly:
      determining a next chunk start time; and
      recording a new current chunk of the at least one chunk, until the next chunk start time has been reached.

4. The method of claim 1, wherein the providing further comprises:
   in an archiving device, receiving each recording instance from a recording device, and splitting the recording instance into a plurality of chunks.

5. The method of claim 1, wherein the providing further comprises:
   verifying that the two or more chunks that each have identical chunk start times and identical chunk end times are bit-for-bit identical.

6. The method of claim 1, wherein the providing further comprises:
   verifying that the two or more chunks that each have identical chunk start times and identical chunk end times have identical checksums.

7. The method of claim 1, wherein the deduplicating further comprises:
   using a first chunk of a first recording instance to deduplicate a corresponding chunk in each of one or more other recording instances.

8. The method of claim 7, wherein the first recording instance corresponds to at least a first portion of a recorded audiovisual content item, and each of the one or more other recording instances corresponds to one or more portions of the recorded audiovisual content item.

9. The method of claim 7, wherein the first recording instance corresponds to at least a first segment of a recorded television program, and each of the one or more other recording instances corresponds to one or more segments of the recorded television program.

10. The method of claim 1, further comprising:
    determining a chunk period based on a program duration, wherein the program duration is not dependent upon a scheduled start time and a scheduled stop time in a recording device.

11. A system for deduplicating recordings of an audiovisual content, the system comprising:
    a processor configured to receive, from a plurality of recording devices in communication with the processor over a network, a first recording instance of an audiovisual content and a second recording instance of the audiovisual content, wherein each recording instance is associated with a corresponding user request to record at least a portion of the audiovisual content from a recording start time to a recording end time;
    the first recording instance comprising a first plurality of chunks of the audiovisual content, and
    the second recording instance comprising a second plurality of chunks of the audiovisual content;
    the processor further configured to provide bit-accurate segmentation of the audiovisual content into a plurality of chunks,
       wherein each chunk has a chunk start time and a chunk end time, and
       wherein, in the plurality of recording instances, any two or more chunks of the audiovisual content are bit-for-bit identical if they each have identical chunk start times and identical chunk end times; and
    the processor further configured to deduplicate a chunk of the first recording instance and a chunk of the second recording instance that each have identical chunk start times and identical chunk end times.

12. The system of claim 11, the processor further configured to
    receive each recording instance from a recording device, and split the recording instance into a plurality of chunks.

13. The system of claim 11, the processor further configured to
verify that the chunk of the first recording instance and the chunk of the second recording instance are bit-for-bit identical.

14. The system of claim 11, the processor further configured to
verify that the chunk of the first recording instance and the chunk of the second recording instance have identical checksums.

15. The system of claim 11, the processor further configured to
use the first chunk of the first recording instance to deduplicate a corresponding chunk in each of one or more other recording instances.

16. The system of claim 11, wherein the first recording instance corresponds to at least a first portion of a recorded audiovisual content item, and each of the one or more other recording instances corresponds to one or more portions of the recorded audiovisual content item.

17. The system of claim 11, wherein the first recording instance corresponds to at least a first segment of a recorded television program, and each of the one or more other recording instances corresponds to one or more segments of the recorded television program.

18. The system of claim 11, the processor further configured to
determine a chunk period based on a program duration, wherein the program duration is not dependent upon a scheduled start time and a scheduled stop time in a recording device.

* * * * *